United States Patent [19]

White

[11] Patent Number: 4,536,378

[45] Date of Patent: Aug. 20, 1985

[54] PHOSPHATE FERTILIZER PRODUCTION

[76] Inventor: Edward A. White, 2250 Greenfield Dr., Glenview, Ill. 60025

[21] Appl. No.: 541,512

[22] Filed: Oct. 13, 1983

[51] Int. Cl.$^3$ .................. C01B 25/16; C01B 15/16; B21B 45/02

[52] U.S. Cl. .................. 423/321 R; 423/310; 423/316; 423/321 S; 71/43

[58] Field of Search .............. 423/316, 317, 318, 319, 423/320, 321 R, 321 S, 310; 71/43

[56] References Cited

U.S. PATENT DOCUMENTS

| | | |
|---|---|---|
| 1,648,146 | 11/1927 | Pevere et al. . |
| 2,891,856 | 6/1959 | Getsinger et al. . |
| 2,902,342 | 9/1959 | Kerley .................. 423/310 |
| 3,141,734 | 7/1964 | Ittlinger . |
| 3,298,782 | 1/1967 | Archambault .................. 423/321 S |
| 3,388,967 | 10/1968 | Ramaradhya . |
| 3,467,162 | 9/1969 | Putnam . |
| 3,644,091 | 11/1972 | Naschke et al. . |
| 3,684,438 | 8/1972 | Gleason . |
| 3,867,511 | 2/1975 | Chiang et al. . |
| 3,890,097 | 6/1975 | Minor . |
| 3,907,680 | 9/1975 | Hill . |
| 3,953,581 | 4/1976 | Ehlers et al. . |
| 3,993,735 | 11/1976 | Irani . |
| 4,018,869 | 4/1977 | Beltz et al. . |
| 4,048,289 | 9/1977 | Pierres . |
| 4,110,422 | 8/1978 | Hill . |
| 4,236,911 | 12/1980 | McCullough et al. . |
| 4,248,846 | 2/1981 | Hill . |
| 4,250,154 | 2/1981 | Hill . |
| 4,280,904 | 7/1981 | Carlson . |
| 4,376,756 | 3/1983 | Mills et al. . |

OTHER PUBLICATIONS

Chemical Abstracts: 79 P 32,163g; 80 P 38,864z; 81 P 65,709e; 83 P 12,906b; 83 P 62,886r; and 90 P 206,663k.
Lawver et al., "Beneficiation of South Florida Carbonate Phosphorites", ISMA Technical Conference, Oct. 1978.
Chemical Abstracts: 78 161,564n; 83 P 134,385b; 86 P 31,584y; 91 P 23,359s; 92 61,065w; 94 159,080p.

*Primary Examiner*—Gregory A. Heller
*Attorney, Agent, or Firm*—Woodcock Washburn Kurtz Mackiewicz & Norris

[57] ABSTRACT

Processes for the preparation of phosphoric acid, such as merchant phosphoric acid, and for the provision of phosphoric acid suitable for the preparation of ammonium phosphates, are disclosed. Such processes comprise providing a source stream of phosphoric acid comprising more than about 30% $P_2O_5$, said source stream having impurities, and removing from the source stream a minor proportion, 20% or less, to form a treatment stream. The level of impurities in the treatment stream is reduced employing any of the means known to those skilled in the art, especially solvent extraction. At least a portion of the treated treatment stream is combined with the balance of the source stream to form a product stream. The treated treatment stream and source stream are proportioned so as to render the product stream less susceptible to post-precipitation than the source stream.

Through employment of the processes of the present invention, it is also possible to provide ammonium phosphate including diammonium phosphate having improved adherence to product specification than heretofore.

Through employment of the processes of the present invention, it is also possible to provide phosphoric acid having a reduced tendency to form and precipitate solids during concentration and immediately after concentration and cooling.

14 Claims, 3 Drawing Figures

PHOSPHATE FERTILIZER PRODUCTION

BACKGROUND OF THE INVENTION

This invention relates to the production of phosphate fertilizers and, more particularly, to the production of diammonium phosphate and "merchant" phosphoric acid.

Fertilizer manufacturers in the United States have established a standard analysis for diammonium phosphate of 18% nitrogen and 46% phosphoric oxide (18-46-0). Similarly, merchant phosphoric acid has a standard analysis of 52 to 54% phosphoric oxide and a solids content of less than 2% by weight when shipped. These standards have allowed diammonium phosphate and merchant phosphoric acid to become fungible products. For the fertilizer manufacturer, there is a need to maintain these standards in order to utilize trade associations in export of these products and to maintain acceptance of products by the trade.

The analysis of diammonium phosphate and the solids content and physical properties of merchant phosphoric acid depend on the impurities content of the phosphoric acid used to make the products. The impurities in turn derive from the phosphate rock used to make phosphoric acid; they remain in the phosphoric acid when gypsum is filtered from the solution formed by the reaction of phosphate rock and sulfuric acid in the various "wet acid" processes used to make fertilizer phosphoric acid.

In addition to precluding attainment of the standard analysis for diammonium phosphate of 18-46-0, excessive levels of impurities also increase solids precipitation when phosphoric acid from the gypsum filtration step is concentrated. Such impurities cause "post-precipitation", the precipitation of solids after shipping. Post-precipitated solids are difficult to remove from shipping and storage vessels, increase the apparent viscosity of the merchant acid making the material more difficult to handle, and decrease the value of the product.

Numerous approaches have been tried to reduce post-precipitation in merchant phosphoric acid; none has met with wide success.

Solids precipitating when filtered acid is concentrated and cooled have been removed by sedimentation or other liquid-solid separations. Solids removed from acid containing about 40% phosphoric oxide ($P_2O_5$) are relatively low in $P_2O_5$ and may be discarded without undue economic loss. However, solids separated as "sludge" from phosphoric acid containing 52 to 54% $P_2O_5$ as in the production of merchant phosphoric acid, contain so much $P_2O_5$ that they cannot be discarded without undue economic loss. Because of the high impurity content of sludge, however, its use such as in the production of phosphate fertilizers is limited. Limited use for the sludge, in turn, has previously limited the fraction of merchant acid that can be produced from wet process phosphoric acid.

Reduction of impurities by precipitating and separating them as solids is disclosed in U.S. Pat. No. 4,376,756. Super phosphoric acid, 70 to 72% $P_2O_5$, and 10-34-0 with reduced tendencies to precipitate solids in storage are produced from mixtures of treated and untreated acids. At least 20% and, typically, 25% or more of the combined acid must be treated to achieve a useful improvement. Further, the examples show a calculated removal of only 7.9 to 9.8% of MgO, $Al_2O_3$ and $Fe_2O_3$ (as equivalents of cations per equivalent $P_2O_5$) from a mixture of treated and untreated dihydrate phosphoric acids at the stated minimum ratio and the minimum typical ratio of treated to untreated acid, respectively.

Other precipitation, filtration and similar schemes are reported in U.S. Pat. Nos. 2,891,856; 3,467,162; 3,684,438; 3,890,097; 3,993,735; 4,236,911 and Chemical Abstracts references 78P 32,163g; 80P 38,864z; 81P 65,709e; 83P 12,906b; 83P 62,886r; and 90P 206,663k.

In addition to reducing impurities by physical separation of solids, a variety of processes have been suggested for reducing impurity levels in merchant phosphoric acid. Dolomite can be removed from phosphate rock by means of heavy media separation and flotation to reduce magnesium impurity levels in the starting materials for acid production. This treatment is applicable only to certain phosphate ores, however. See in this regard, Lawver et al. "Beneficiation of South Florida Carbonate Phosphorites", ISMA Technical Conference, October 1978.

Cation removal by ion exchange has also been suggested to reduce impurity levels in phosphoric acid. See, for example, U.S. Pat. No. 4,280,904. The limited capacity of strong acid exchange resins and the relatively high concentration of cationic impurities in wet process phosphoric acid require a large volume of resin in relation to acid volume; the ratio of resin volume to acid volume can approach unity. Because of this high volume of resin, losses of phosphoric acid are high and the products suffer from dilution in washing the loaded resin. Moreover, regeneration acid for regenerating the resin is needed. In practice, about two equivalents of regeneration acid are consumed per equivalent of cation impurity removed. Accordingly, high costs attend this approach. See also U.S. Pat. No. 3,993,735.

Solvent extraction has been used to purify phosphoric acid. Typically, these processes have been operated to produce a relatively pure phosphoric acid for industrial chemical use. One process described in U.S. Pat. No. 3,867,511 produces a partially purified phosphoric acid for liquid fertilizer use. The impurities removed from the extracted phosphoric acid, however, are concentrated, for example, as raffinate phosphoric acid. The quantity of $P_2O_5$ in the raffinate is too large—30 to 50% of the $P_2O_5$ fed to the process—to be discarded. In this respect, the solvent extraction purification described in U.S. Pat. No. 3,867,511 is like separation of precipitated solids from 52 to 54% $P_2O_5$ phosphoric acid. An improved product is obtained, but a co-product stream containing a high level of impurities is produced. The impure co-product must be commercially utilized for efficient operation of the phosphate fertilizer plant.

Other methods for purification of phosphoric acid through solvent separation are reported in U.S. Pat. Nos. 3,388,967; 3,953,581; and 4,018,869.

Still other approaches to acid purification are related in U.S. Pat. Nos. 1,648,146; 3,141,734; 3,644,091; 3,907,680; 4,110,422; 4,248,846; 4,048,289; and 4,250,154 together with Chemical Abstracts 78 161,564n; 83P 134,385b; 86P 31,584y; 91P 23,359s; 92 61,065w and 94 159,080p.

OBJECTS OF THE INVENTION

It is an object of this invention to provide improved methods for producing merchant phosphoric acid having a reduced tendency to experience post-precipitation of solid impurities.

It is another object of this invention to provide merchant phosphoric acid having close adherance to chemical and physical specifications.

A further object is to provide phosphoric acid for production of mono- and diammonium phosphate, the latter having a standard analysis of about 18-46-0.

Yet another object is to provide an integrated method of manufacturing merchant phosphoric acid from phosphate ore employing solids separation and solvent extraction processes in a cooperative fashion to provide merchant phosphoric acid at an economical cost with a reduced tendency to post-precipitate.

Other objects will become apparent from a review of the instant specification.

SUMMARY OF THE INVENTION

The present invention provides processes for the preparation of phosphoric acid comprising providing a source stream of phosphoric acid comprising more than about 30% $P_2O_5$, and having a level of impurities. A minor proportion of the source stream, 20% or less, is removed or diverted to form a treatment stream which undergoes treatment to reduce the level of impurities therein. At least a portion of the treatment stream is recombined with the balance of the source stream to form a product stream. The treatment and source streams are proportioned among themselves so as to provide a product stream having levels of impurities which are sufficiently low as to result in a product stream having a diminished tendency to post-precipitate compared to the source stream. In accordance with certain preferred embodiments, very large proportions of the impurities of the treatment stream are removed during the treatment step. Preferably, at least 90% of the impurities are so removed. Even more preferably, at least about 95% of the impurities are so removed.

In accordance with another preferred embodiment, the treatment step is accomplished via solvent extraction of the treatment stream in accordance with one or more of the processes known to those skilled in the arts. It is also preferred for some uses to contact the treatment stream after the treatment step has been accomplished with an aqueous ammonia stream to assist in removal of phosphoric acid from the treatment stream. This is especially preferred when the treatment step comprises solvent extraction. In such a case, the product stream is ideally suited for employment in connection with the manufacture of monoammonium phosphate and/or diammonium phosphate.

In view of the fact that control of the level of impurities in the product stream may be had by the employment of one or more embodiments of the present invention, it is also possible to concentrate the product stream—to increase its level of $P_2O_5$—without reaching a level of impurities which is sufficiently high as to cause post-precipitation or which will result in the manufacture of ammonium phosphates having improper specifications.

The processes of the present invention enjoy substantial advantages over those heretofor known or proposed for use for maintaining the standards of merchant phosphoric acid and of the various ammonium phosphates produced therefrom. By treating only a minor proportion, 20% or less, of the source stream, the phosphoric acid, rather than a major proportion or its entirety, energy consumption, reagent consumption and equipment requirements are reduced. Additionally, flexibility in allocation of phosphoric acid to various subsequent processes is gained.

Figure 1:
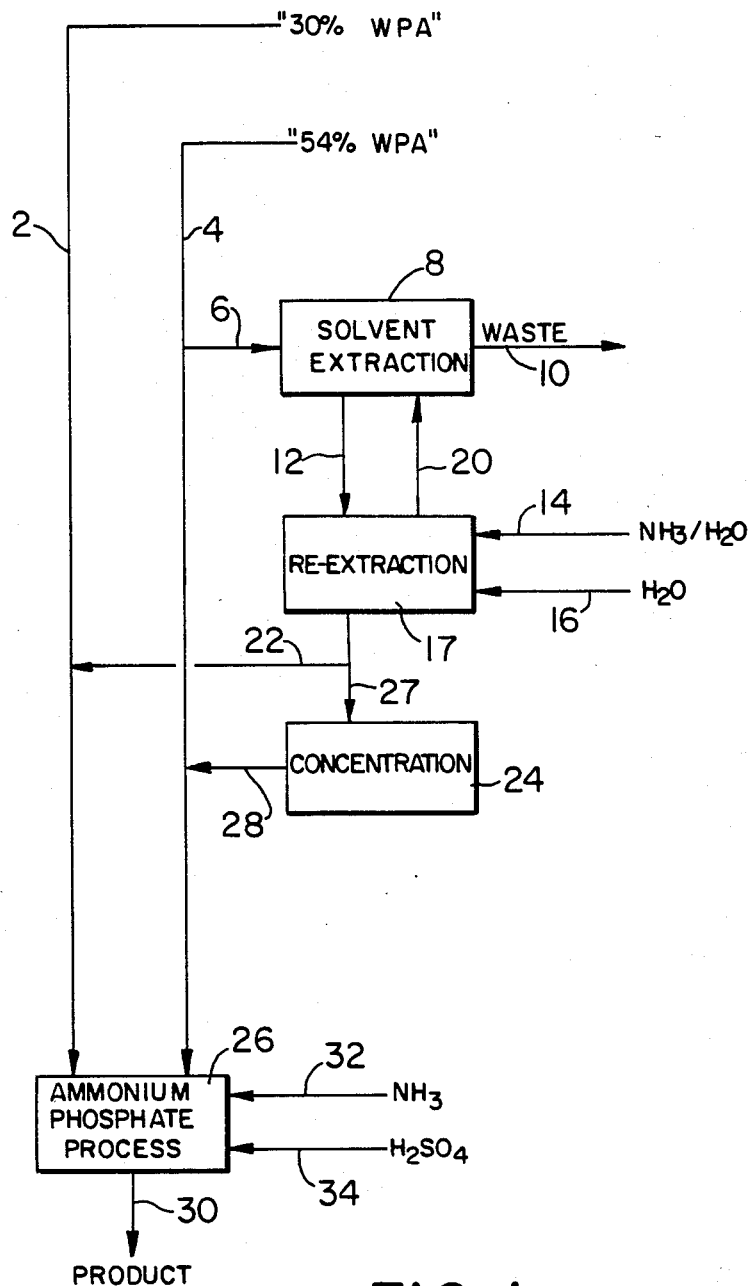
FIGS. 1, 2 and 3 are flow diagrams depicting certain embodiments of the novel processes of this invention.

FIG. 1 depicts a flow chart for a preferred embodiment of the present inventive processes for application to the production of one or more ammonium phosphates including monoammonium phosphate and diammonium phosphate such as 18-46-0 diammonium phosphate.

The treatment processes which may be employed for the treatment of the treatment stream in accordance with the present invention may be any of the processes which are capable of removing substantial quantities of the impurities from phosphoric acid. Thus, processes which are suitable to the removal of impurities from wet process phosphoric acid, such as 30% phosphoric acid from any of the numerous commonly known wet processes for the production of phosphoric acid may be employed herein. Additionally, processes suitable for removing impurities from 54% phosphoric acid and from other phosphoric acids may be employed as well. It is preferred that solvent extraction processes be employed in the treatment stream to remove the impurities therefrom.

The solvent extraction process is preferably one that affords a recovery of $P_2O_5$ in the extract stream in excess of about 90%. With this level of extraction, it is economically feasible to discard the raffinate by-product, i.e. the stream containing the impurities, unextracted $P_2O_5$ and reagents such as sulfuric acid added for the extraction process. One such process is the Phorex process, a trademark of the Azote Et Produits Chimiques S. A. of Toulouse, France. See Bergdoff et al. "Extractive Phosphoric Acid Purification" CEP (American Institute of Chemical Engineers) November 1978, pp. 41–45. Other solvent extraction processes may also be employed, however.

Processes for the purification of phosphoric acids which do not require solvent extraction may also be employed in accordance with the practice of the present invention.

Such processes include "salting-out", whereby impurities are precipitated by addition of a miscible organic solvent, "ion exchange" to remove cationic and anionic impurities, crystallization of purified crystals of phosphoric acid from solution by various means, and electrodialysis.

For maintenance of diammonium phosphate (DAP) specification, a portion of the source phosphoric acid stream is diverted as a treatment stream to a purification process such as solvent extraction in an amount and at a concentration appropriate to the selected process. See generally FIG. 1. The quantity of phosphoric acid diverted is that required to maintain diammonium phosphate grade at 18-46-0 after recombination of the solvent extracted $P_2O_5$ treatment stream with the balance of the source system. Aqueous ammonia may preferably be used to strip phosphoric acid from the pregnant organic solvent in the re-extraction step of the solvent extraction when ammonium phosphate production is intended.

Figure 2:
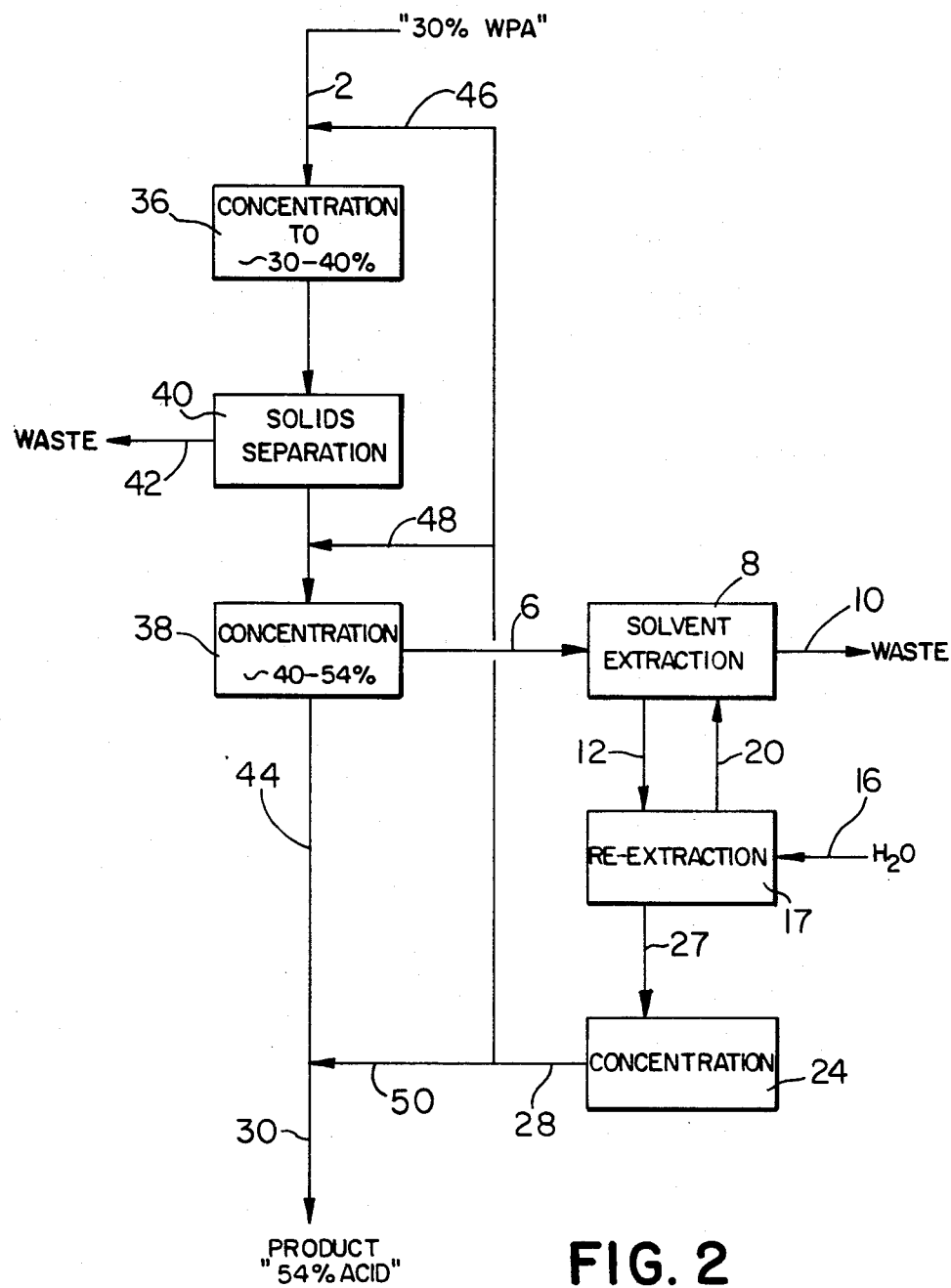

For control of post-precipitation in merchant phosphoric acid, a portion of the phosphoric acid source stream is diverted to a solvent extraction or other purification process as shown in FIG. 2. Depending on the solvent extraction process selected, the stream may be merchant phosphoric acid at concentrations up to about 55% $P_2O_5$, preferably 52% to 54% $P_2O_5$. The quantity of phosphoric acid diverted is that required to eliminate supersaturation and subsequent precipitation of solids in the product merchant acid stream after recombination of the treated treatment and source streams. Water is preferably used to strip the phosphoric acid from the pregnant organic solvent in the re-extraction step of the solvent extraction in this case. The aqueous extract from the solvent extraction section may preferably be concentrated to about 52 to 54% or higher $P_2O_5$ before recombination with the source stream of merchant phosphoric acid.

For suppression of solids formation upon concentration of phosphoric acid to 52 to 54% $P_2O_5$, a portion of the phosphoric acid being concentrated, the source stream, is diverted to a solvent extraction or other process at a concentration appropriate to the process selected. See generally FIG. 3. The quantity diverted is that required to reduce supersaturation and subsequent precipitation of solids to the desired degree. Depending on the composition of the phosphoric acid, it may be desirable to suppress all or nearly all solids precipitation or to suppress only the precipitation of phosphate compounds such as

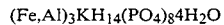

and allow the precipitation of gypsum. After separation and washing, gypsum can be discarded without significant economic loss. Water is preferably used to strip phosphoric acid from the pregnant organic solvent in the re-extraction step of solvent extraction in connection with this embodiment. The aqueous extract of phosphoric acid may be concentrated in the treated treatment stream to about 52 to 54% $P_2O_5$ or returned directly to the acid stream for subsequent concentration. Concentration in the treatment stream can permit more efficient, double effect evaporative concentration. Direct return to the source stream can utilize existing evaporation capacity and obviate additional evaporation capacity in the separate treatment stream.

For the combination of DAP grade maintenance and suppression of solids precipitation in 52 to 54% $P_2O_5$ acid, water rather than aqua ammonia may be used for stripping phosphoric acid from the pregnant organic solvent. Phosphoric acid rather than ammonium phosphate is then returned to the untreated phosphoric acid source stream. Alternately, the preferred re-extraction step of the preferred solvent extraction treatment process may be separated into two stages, with water used for stripping in the first stage and aqueous ammonia used in the second stage. This produces both purified phosphoric acid for suppression of solids precipitation and an aqueous ammonium phosphate solution for maintenance of DAP grade in the preparation of diammonium phosphate. Each of the foregoing may be combined with one or more physical separation process for removal of precipitated solids from the source stream.

Figure 3:
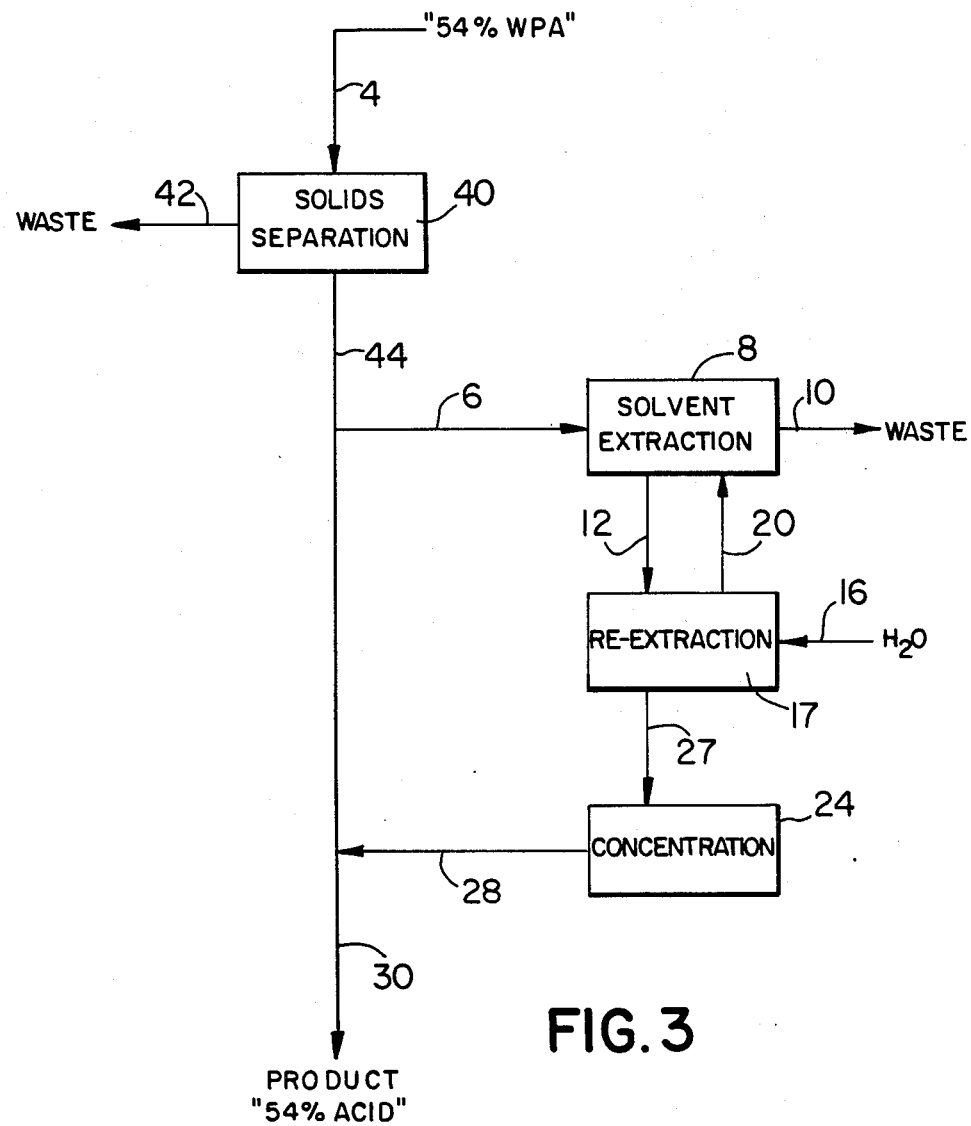

Additional understanding of the process of the invention can be obtained from a review of FIGS. 1-3 and from the non-limiting examples.

FIG. 1 illustrates an embodiment of the invention as applied to the manufacture of ammonium phosphate fertilizers. Wet process phosphoric acids (WPA) in two nominal concentrations, 30% in source stream 2 and 54% in source stream 4, are typical phosphate inputs. Anhydrous ammonia in line 32 and aqua ammonia in line 14 are the nitrogen inputs.

A minor portion of the "54%" WPA of source stream 4 is diverted via a treatment stream 6, to a treatment process 8, such as a solvent extraction plant. The actual concentration at which the WPA is diverted depends on the requirements of the solvent treatment process chosen. The treatment process may require pretreatment of the phosphoric acid treatment stream 6. Pretreatment may include removal of solids, fluoride and fluosilicate, sulfate and organics depending on the solvent treatment process chosen.

The preferred treatment process, solvent extraction, generates two products, an impurities or waste stream 10 as raffinate and an organic extract 12. The waste stream 10 also provides an outlet for materials removed in any pretreatment steps. The $P_2O_5$ in the waste stream preferably should not exceed about 10 to 15% of the feed $P_2O_5$ for the treatment process chosen.

When treatment is via solvent extraction, organic extract 12 is preferably contacted countercurrently with aqueous ammonia 14 or process water 16 in a re-extraction step 17. Stripped organic material is recovered and returned to the primary solvent extraction via line 20. Aqueous ammonia is preferred for production of ammonium phosphate fertilizers because a higher $P_2O_5$ concentration can be obtained in the treated treatment stream 22.

The treated treatment stream 22 will be a solution of ammonium phosphate and/or phosphoric acid, depending on whether aqua ammonia or process water is used for re-extraction. The dilute, purified treatment stream 22 can be added to the nominal 30% WPA source stream. Alternately, this stream can be conducted to an evaporation step 24 via line 27. Because of the very low level of silicofluoride in the acid treated by solvent extraction, multiple effect evaporation can be carried out without silica deposition on the evaporator heat transfer surfaces. Concentrated acid may be sent to Ammonium Phosphate production 26 via line 28, where anhydrous ammonia 32 and sulfuric acid 34 are combined therewith to provide the ammonium phosphate products 30. Part of the concentrated acid may be discharged for other uses as desired.

For controlling product analysis (N and $P_2O_5$ content) in product ammonium phosphate 30 aqueous ammonia stripping of the laden solvent is preferred since higher concentrations of $P_2O_5$ are obtained in the ammonium phosphate solution. Moreover, less energy is consumed to eliminate water as compared to using process water to prepare a phosphoric acid solution.

For fertilizer grade granular diammonium phosphate production, WPA at about 40% $P_2O_5$ concentration is typically required. The proportions of nominal 30% and 54% WPA are controlled to give a combined concentration of about 40% $P_2O_5$. Addition of ammonium phosphate or dilute phosphoric acid to the nominal 30% WPA requires reproportioning quantities of the nominal 30% WPA and 54% WPA.

EXAMPLE 1

Two source streams 30% and 54% of WPA proportioned to give a combined concentration of about 40% $P_2O_5$ were introduced to an ammonium phosphate plant. Analyses of the two streams are shown in Table 1 as weight percent.

TABLE 1

| Component | "30%" WPA | "54%" WPA | Combined "40% WPA" |
|---|---|---|---|
| $P_2O_5$ | 27.6 | 54.2 | 40.4 |
| $Fe_2O_3$ | 1.26 | 1.89 | 1.56 |
| $Al_2O_3$ | 0.86 | 1.51 | 1.17 |
| MgO | 0.51 | 0.86 | 0.67 |
| CaO | 0.23 | 0.13 | 0.18 |
| $K_2O$ | 0.055 | 0.055 | 0.055 |
| $Na_2O$ | 0.11 | 0.12 | 0.11 |
| F | 2.12 | 1.49 | 1.82 |
| $SO_4$ | 2.23 | 3.42 | 2.80 |

Anhydrous ammonia and sulfuric acid were also added. The ratios of $P_2O_5$, $NH_3$ and $H_2SO_4$ were about 100:11.26:3.84. Reaction of the materials yielded a diammonium phosphate product with an analysis of 18.1% nitrogen, 46.4% $P_2O_5$, and 1.2% free water after drying. This analysis meets requirements for both U.S. and foreign sale as fertilizer grade diammonium phosphate.

EXAMPLE 2

Magnesium was added to a sample of combined "40% WPA" having the analysis shown in Table 1 above. This was done to simulate WPA from phosphate rock having a relatively high level of magnesium oxide impurity. After addition of 0.245 units of magnesium per hundred units of acid, the analysis of the "40%" acid was as given in Table 2.

TABLE 2

| Component | Weight Percent |
|---|---|
| $P_2O_5$ | 40.3 |
| $Fe_2O_3$ | 1.55 |
| $Al_2O_3$ | 1.17 |
| MgO | 1.08 |
| CaO | 0.18 |
| $K_2O$ | 0.054 |
| $Na_2O$ | 0.11 |
| F | 1.81 |
| $SO_4$ | 2.80 |

This change in MgO concentration corresponds to increasing the MgO concentration in the phosphate rock used for production of phosphoric acid via a wet process from about 0.5% to about 0.8%.

Ammonia and sulfuric acid were then combined with the "40%" acid in the same weight ratio as before. However, reaction of the materials introduced yielded a diammonium phosphate product analyzing only 17.8% nitrogen and 46.4% $P_2O_5$ after drying to 1.2% free water. This product does not meet requirements for sale as fertilizer grade diammonium phosphate. The low nitrogen analysis resulted from loss of ammonia due to substitution of magnesium ion for hydrogen ion in the WPA. The same substitution is believed to occur when there are magnesium impurities in native phosphate rock used for phosphoric acid production in this process.

EXAMPLE 3

An identical sample of the "40% WPA" with added magnesium of Example 2 was divided into two portions. One minor portion was concentrated to about 54% $P_2O_5$ and treated by solvent extraction as described above in connection with FIG. 1 employing a process similar to the Phorex ™ process. After re-extraction and evaporation to about 40% $P_2O_5$, the treated portion was combined with the untreated portion in the proportion of 7% of $P_2O_5$ from treated acid and 93% from the untreated acid. Ammonia and sulfuric acid were reacted with the combined phosphoric acid as in Examples 1 and 2. The diammonium phosphate product from the ammoniation of the acids mixture analyzed 18.1% N, and 46.4% $P_2O_5$ after drying to 1.2% free water. The product met requirements for sale as fertilizer grade diammonium phosphate.

The procedure of the invention as exemplified above also can be used to produce fertilizer grade monoammonium phosphate meeting sales specification from WPA which otherwise would not yield a monoammonium phosphate product within specifications.

EXAMPLE 4

Magnesium was added to two WPA samples, "30% WPA" and "54% WPA", having the composition shown in Table 1. Magnesium was added to the extent of 0.183 units per 100 units of "30 percent" WPA and 0.273 units per 100 units of "54 percent" WPA. Table 3 shows the analyses of the two acids after magnesium additions and the analysis of a sample of the two acids when combined to give a concentration of about 40% $P_2O_5$. Analyses are weight percent.

TABLE 3

| Component | "30%" WPA | "54%" WPA | Combined "40% WPA" |
|---|---|---|---|
| $P_2O_5$ | 27.6 | 54.1 | 40.3 |
| $Fe_2O_3$ | 1.26 | 1.88 | 1.56 |
| $Al_2O_3$ | 0.85 | 1.51 | 1.56 |
| MgO | 0.74 | 1.45 | 1.08 |
| CaO | 0.23 | 0.13 | 1.08 |
| $K_2O$ | 0.055 | 0.054 | 0.054 |
| $Na_2O$ | 0.11 | 0.12 | 0.11 |
| F | 2.12 | 1.49 | 1.81 |
| $SO_4$ | 2.22 | 3.41 | 2.80 |

Ammonia and sulfuric acid were introduced to a sample of the combined acid in the weight ratio to $P_2O_5$ described in Example 1. Reaction of the materials yielded an unacceptable diammonium phosphate product analyzing 17.8% nitrogen and 46.4% $P_2O_5$ after drying to 1.2% free water.

EXAMPLE 5

Example 4 was repeated with treatment of a treatment stream. A minor portion of the "54% WPA" was pretreated and purified by solvent extraction. The raffinate stream and the material removed in pretreatment contained 8% of the $P_2O_5$ input to solvent extraction. Aqueous ammonia was used for re-extraction yielding a stream containing 5.0% N and 25.5% $P_2O_5$. The ammonium phosphate extract was then combined with the "30% WPA" source stream in a ratio of 9.9 units of extract to 43.7 units of "30% WPA". This combined product stream and a source stream of "54% WPA" together with ammonia and sulfuric acid were reacted to yield diammonium phosphate. The ratio of the combined stream to the "54% WPA" stream was 53.6 units to 46.4 units of "54% WPA". Sulfuric acid was added in the ratio to $P_2O_5$ used in Example 1. Ammonia was added in the ratio to $P_2O_5$ used in Example 1 reduced by 0.0151 units of $NH_3$ per unit $P_2O_5$ to compensate for the ammonia introduced in re-extraction. When dried to 1.2% free water, the diammonium phosphate product analyzed 18.1% N and 46.4% $P_2O_5$. This product meets contents specifications for fertilizer use.

FIG. 2 illustrates an embodiment of the invention as applied to the control of solids formation in the concentration of WPA. Nominal "30% WPA" 2 is shown being concentrated in two stages 36, 38, with intermediate solids separation 40. Solids are rejected via waste line 42. Concentrated nominal "54%" $P_2O_5$ WPA, is discharged via source stream.

A minor proportion of the concentrated WPA is diverted to the solvent extraction plant via treatment stream 6. The actual concentration at which the WPA is diverted depends on the requirements of the solvent extraction process chosen. The functions of solvent extraction in the process of FIG. 2 are the same as in the process of FIG. 1. In solvent extraction, WPA is separated into an impurities stream 10 and an organic extract 12. The impurities stream 10 also provides an outlet for materials removed in any pretreatment. Rejection of $P_2O_5$ via 10 preferably should not exceed about 10 to 15% of the $P_2O_5$ fed to the solvent extraction process. Organic extract 12 is preferably contacted countercurrently with process water 16 during re-extraction step 17 to yield aqueous phosphoric acid 27 and stripped organic 20. The aqueous phosphoric acid 27 is then preferably concentrated 24 such as in an evaporation step. Double effect evaporators may be used to reduce energy consumption in evaporation.

Concentrated, treated WPA 28 leaves the concentration step for recombination with the major, untreated proportion of WPA 44. The addition of treated acid may be made at any of three stages in the process such as at 46, 48 or 50. Recombination via line 46 of a minor proportion of concentrated, treated WPA with the untreated portion of WPA reduces solids formation throughout the evaporation and solids separation train. The reduction in solids formation in the WPA and in their elimination via line 42 is attended by an increase in the quantity of impurities discharged from solvent extraction. By increasing the proportion of WPA treated by solvent extraction and recombining the treated acid with untreated acid prior to evaporation, solids formation can be virtually completely suppressed. With solids formation suppressed, handling of WPA is simplified greatly. Thus rakes are not required in storage tanks and evaporator "boil-outs" to remove scale are required less frequently and are sometimes eliminated.

Impurity elimination by solvent extraction typically consumes more energy and materials than separation of the solids that form when WPA is concentrated to about 40% $P_2O_5$ and cooled. Since these solids are largely gypsum and fluosilicates, relatively little $P_2O_5$ is lost in their disposal. Accordingly, for reduced energy and material use, it is preferred to recombine the concentrated, treated WPA with untreated acid via line 48, i.e. after separation of solids formed by evaporation of WPA to 40% $P_2O_5$ and cooling but before evaporation to nominal 54% $P_2O_5$. Deposition of solids in the evaporator(s) is not reduced by addition of concentrated, treated acid via line 50. However, this may also be done if desired.

FIG. 3 illustrates an embodiment of the invention as applied to control of post-precipitation in merchant phosphoric acid. Merchant phosphoric acid typically is specified to contain less than 2% solids by weight at the time of shipment. Merchant acid is produced by cooling and aging nominal 54% WPA and then separating solids from the acid. The acid tends to precipitate additional solids over a long period of time, however. When post-precipitation is significant in a storage or shipping vessel, difficulty is experienced with unloading. Frequently, only the clear supernatant can be removed. A sludge remains so that additional expense is incurred for cleaning and freight. If the sludge removed from the vessel cannot be used, the value of the $P_2O_5$ in the sludge is lost.

In the process of FIG. 3, 54% WPA that has been cooled and aged 4 is treated for solids separation 40 producing a clarified merchant acid stream 44 and a solids in acid waste stream 42. A minor proportion 6 of the merchant acid is sent to treatment 8 such as solvent extraction. The function of solvent extraction 8, re-extraction 17, and evaporation 24 has been described in connection with FIGS. 1 and 2. Concentrated, treated WPA 28 is added to the major, untreated proportion of the WPA to give stabilized product merchant acid 30. Concentrated, treated WPA may be diverted to other processes if desired.

EXAMPLE 6

A sample of freshly prepared merchant phosphoric acid was divided into two samples after the solids and $P_2O_5$ content had been determined. WPA that had been treated by Solvent Extraction in a process similar to the Phorex TM process, and adjusted to the merchant acid $P_2O_5$ content was added to one sample in the proportion of 5 parts treated acid 95 parts untreated. This sample was designated "treated". The other sample which was not treated was designated "control". Periodic analyses were made of solids content. Results are shown in Table 4 below.

TABLE 4

| Elapsed Time | Weight Percent Solids in | |
|---|---|---|
| Days @ 25–27° C. | "Control" | "Treated" |
| 0 | 0.45 | 0.45 |
| 5 | 1.07 | 0.46 |
| 10 | 2.21 | 0.48 |
| 15 | 3.01 | 0.50 |
| 20 | 3.82 | 0.49 |

In accordance with another embodiment of this invention, any of the previous embodiments can be supplemented by the addition of "pure" phosphoric acid, such as that obtained from pyrolytic reaction, to one or more of the process streams. Thus, furnace phosphoric acid may be added at 28 in FIGS. 1–3 to supplement the treated treatment stream if desired.

What is claimed is:

1. A process for the preparation of phosphoric acid comprising:
   providing a source stream of phosphoric acid comprising more than about 30% $P_2O_5$, said source stream having impurities;
   removing from the source stream from about 1% to about 20% of said stream to form a treatment stream;
   removing at least about 90% of the cationic, anionic and organic impurities in the treatment stream by solvent extraction; and
   combining at least a portion of the treatment stream with the balance of the source stream in proportions sufficient to form an improved phosphoric acid stream having reduced post-precipitation when said improved stream is processed to produce merchant phosphoric acid.

2. The process of claim 1 wherein at least about 95% of the cationic, anionic and organic impurities in the treatment stream are removed.

3. The process of claim 1 further comprising adding furnace phosphoric acid or purified phosphoric acid containing about the same ratio of impurities to $P_2O_5$ as furnace phosphoric acid in place of a portion of the treatment stream.

4. The process of claim 1 wherein the product stream is concentrated to increase its $P_2O_5$ concentration.

5. A process for the preparation of phosphoric acid comprising:

providing a source stream of phosphoric acid comprising more than about 30% $P_2O_5$, said source stream having impurities;

removing from the source stream from about 1% to about 20% of said stream to form a treatment stream;

removing at least about 90% of the cationic, anionic and organic impurities in the treatment stream by solvent extraction; and combining at least a portion of the treatment stream with the balance of the source stream in proportions sufficient to provide 18-46-0 fertilizer grade diammonium phosphate when said product stream is reacted with ammonia and sulfuric acid in quantities sufficient but not in excess of those required to provide an 18-46-0 analysis.

6. The process of claim 5 wherein at least about 95% of the cationic, anionic and organic impurities in the treatment stream are removed.

7. The process of claim 5 further comprising adding furnace phosphoric acid or purified phosphoric acid containing about the same ratio of impurities to $P_2O_5$ as furnace phosphoric acid in place of a portion of the treatment stream.

8. The process of claim 7 wherein said solvent is contacted by an aqueous ammonia stream to remove phosphoric acid therefrom.

9. The process of claim 5 wherein the treatment stream is combined with the balance of the source stream in proportion sufficient to provide a fertilizer grade monoammonium phosphate with a higher nitrogen and phosphate content when reacted with ammonia as compared to fertilizer grade monoammonium phosphate produced by reacting the source phosphoric acid with ammonia.

10. The process of claim 5 wherein the improved stream is concentrated to increase its $P_2O_5$ concentration.

11. A process for the preparation of phosphoric acid comprising:

providing a source stream of phosphoric acid comprising more than about 30% $P_2O_5$, said source stream having impurities;

removing from the source stream from about 1% to about 20% of said stream to form a treatment stream;

removing at least about 90% of the cationic, anionic and organic impurities in the treatment stream by solvent extraction; and combining at least a portion of the treatment stream with the balance of the source stream in proportions sufficient to form reduced quantities of solids in the product stream upon concentration or concentration and cooling.

12. The process of claim 11 wherein at least about 95% of the cationic, anionic and organic impurities in the treatment stream are removed.

13. The process of claim 11 further comprising adding furnace phosphoric acid or purified phosphoric acid containing about the same ratio of impurities to $P_2O_5$ furnace phosphoric acid in place of a portion of the treatment stream.

14. The process of claim 11 wherein the source stream is concentrated to about 40% $P_2O_5$, cooled and treated to remove solids before removing from the source stream a minor proportion of said stream to form a treatment stream.

* * * * *